United States Patent [19]
Hess

[11] 3,943,084
[45] Mar. 9, 1976

[54] METHOD FOR DELAYING THE SETTING OF AND ACID-SETTABLE LIQUID IN A TERRESTRIAL ZONE

[75] Inventor: Patrick H. Hess, Diamond Bar, Calif.

[73] Assignee: Chevron Research Company, San Francisco, Calif.

[22] Filed: Nov. 23, 1973

[21] Appl. No.: 418,624

Related U.S. Application Data

[62] Division of Ser. No. 273,256, July 19, 1972, Pat. No. 3,850,249.

[52] U.S. Cl........ 260/29.6 H; 166/295; 260/29.6 R; 260/67 FA
[51] Int. Cl.² .......................................... C08G 4/00
[58] Field of Search...... 260/29.6 R, 29.6 H, 67 FA, 260/88.5; 166/295

[56] References Cited
UNITED STATES PATENTS

| | | |
|---|---|---|
| 2,399,055 | 4/1946 | Nordlander .................. 260/67 FA |
| 2,471,600 | 5/1949 | Adams Jr. et al. ................. 260/88.5 |
| 2,499,275 | 2/1950 | McWhorter .................... 260/67 FA |
| 3,209,826 | 10/1965 | Young ................................. 166/295 |
| 3,597,386 | 8/1971 | Brabander ..................... 260/67 FA |
| 3,700,604 | 10/1972 | Metil .............................. 260/67 FA |
| 3,759,327 | 9/1973 | Carnes ............................... 166/295 |

Primary Examiner—Eugene C. Rzucidlo
Attorney, Agent, or Firm—G. F. Magdeburger; John Stoner, Jr.; W. Keith Turner

[57] ABSTRACT

In an improved method for the treatment of a permeable formation or zone adjacent to the bore of an oil well, the setting time of an acid-settable liquid is predictably delayed by use of a novel catalyst system. The method provides an effective means for controlling the reduction of the permeability of the formation or zone in a single stage treatment by dissolving the catalyst in the liquid and introducing the solution into the formation. The catalyst system comprises a mixture of a suitable acid-releasing compound and a base.

6 Claims, 3 Drawing Figures

ONE-STEP FURFURYL ALCOHOL FORMATION PLUGGING METHOD 3,943,084

METHOD FOR DELAYING THE SETTING OF AND ACID-SETTABLE LIQUID IN A TERRESTRIAL ZONE

This is a division of application Ser. No. 273,256 filed July 19, 1972, now U.S. Pat. No. 3,850,249.

FIELD OF THE INVENTION

This invention relates to a novel method for the setting of an acid-settable liquid. More particularly, it relates to delaying the setting of an acid-settable liquid where the acid is released (generated) in situ in the liquid. Still more particularly, it relates to a new and improved method for treating a terrestrial zone or formation by introducing a homogeneous liquid mixture of an acid-settable liquid, an acid-releasing compound and a base into a terrestrial zone or formation, particularly a permeable zone or formation adjacent to the bore of an acid or gas well.

BACKGROUND OF THE INVENTION

Acid-settable liquids are known and used in the art. Usually the liquid and a suitable acid are mixed and the liquid sets, gels or polymerizes. In the ordinary case the timing of the setting depends upon a precise adjustment of the acid concentration, and effective mixing of the reactants, otherwise the desired setting may occur too soon, only after a long time or not at all. In general, a treatment of an oil well by the introduction of a homogeneous mixture of an acid and an acid-settable liquid into a zone or formation adjacent to a well bore is relatively unsatisfactory because of the lack of practical control of the time factor. One proposal (U.S. Pat. No. 3,537,522) has been to introduce a mixture of an acid-releasing (AR) compound and a acid-settable liquid into a formation containing water. The interaction of the formation water and the AR compound is expected to produce the acid required to catalyse the desired setting of the liquid. Included among the disadvantages of this proposal is the limitation that it is only useful for a water containing formation, and it is subject to the vagaries as to the amount of water available in a formation, the adequacy of the mixing of the water and acid-settable liquid, and the like. In general, methods which require the introduction of acid-setting reaction components into a formation in stages are unsatisfactory in the absence of positive control means, effective mechanical mixing and the like, and these means are, in general, not available in many circumstances, for example in an earthen formation or zone, or in the treatment of a zone adjacent to a well bore. Other disadvantages experienced in the use, as known in the art, of acid-settable liquids for the treatment of earthen formations or zones include:

1. the problem of keeping the reactants separated until the desired encounter in the formation;
2. the problem of obtaining a timely encounter of the acid and acid-settable fluid in the formation;
3. the problem with flash-setting fluids such as furfuryl alcohol and the like in view of their extreme sensitivity to local fluctuation in pH; and
4. the relatively inefficient utilization of the reagents due to incomplete mixing of the fluid and catalyst in the formation.

SUMMARY OF THE INVENTION

Pursuant to this invention, the time of the setting of an acid-settable hydroxylic liquid or an acid-settable liquid containing an effective amount of a hydroxylic diluent is controlled, especially in the treatment of a terrestrial formation or zone with an acid-settable liquid, by the use of a delayed catalyst system which is dissolved in the acid-settable liquid. For each 100 parts of the liquid, the solution contains a minor amount of the catalyst system, usually an amount in the range from 2 to 20 parts.

The delayed catalyst system includes one or more compounds which release a strong acid, preferably a mineral acid, under solvolytic conditions at a temperature in the range from $-10°C$. to $175°C$. It also contains one or more suitable bases capable of neutralizing a strong acid to form a salt. The amount of the base component, the moiety causing the delay of the acid catalysed setting of the liquid, must be less than the stoichiometric equivalent of the strong acid potentially available from the acid-releasing (AR) compound(s). Thus, for each potential equivalent of strong acid obtainable from the acid-releasing compound(s), the catalyst system should contain an amount of the base in the range from about 0.02 to 0.98 equivalent.

The use of a delayed catalyst system for the setting of an acid-settable liquid, as herein described, results in many advantages including:

1. it provides effective delay and control of the timing of the desired catalytic action;
2. it permits the introduction of an acid-settable liquid and the catalyst system as a unit into the subterranean zone as a one-stage operation;
3. it provides a method which can be used over a wide range of temperatures, particularly the elevated temperatures frequently encountered in subterranean zones;
4. in a particular embodiment it provides a catalyst system which can be prepared in advance, stored and conveniently transported to the field; and
5. it has other advantages which will become evident in the description to follow.

Throughout this description the term "parts" relates to parts by weight of the material under consideration.

DESCRIPTION OF A PREFERRED EMBODIMENT

Figure 1:
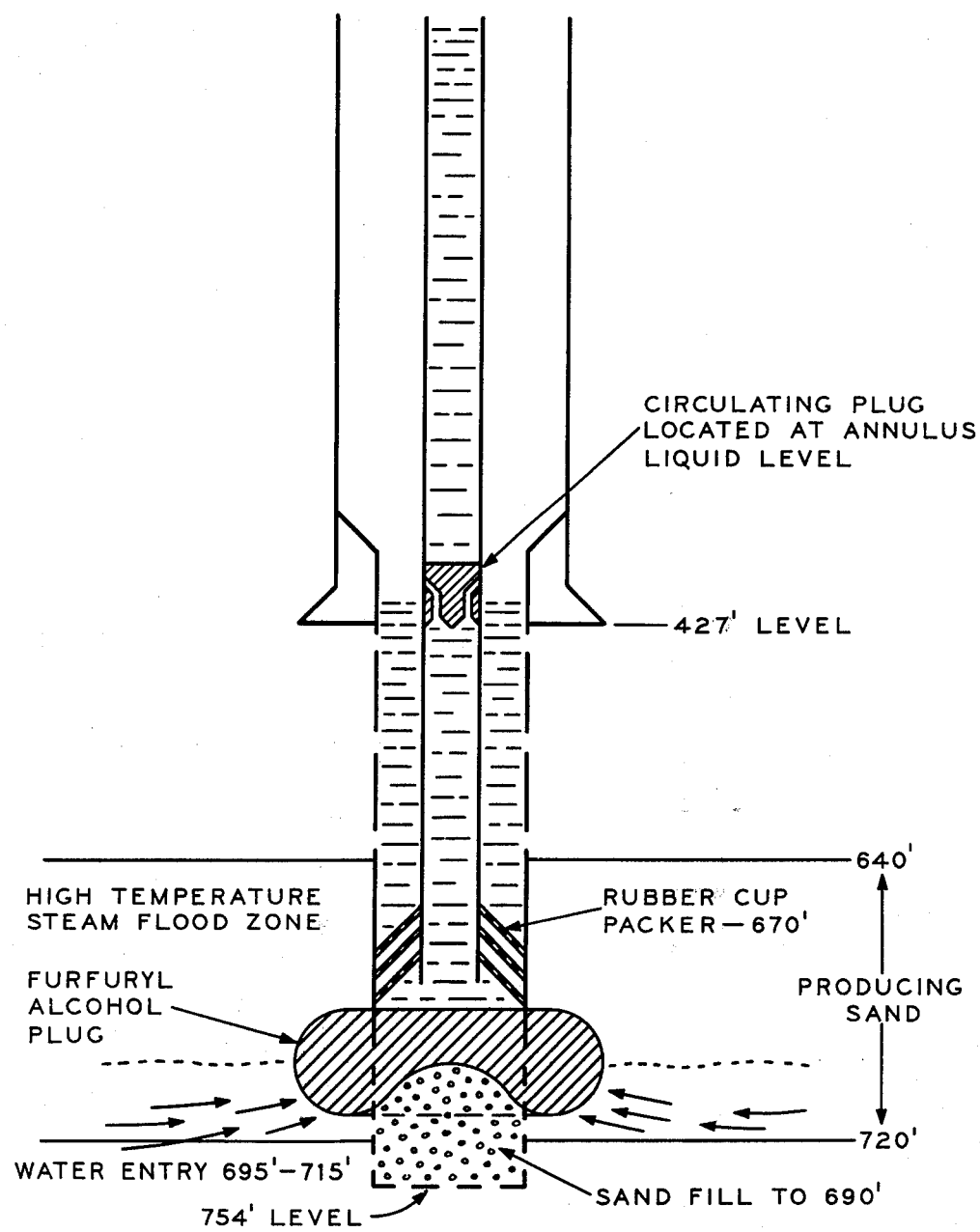

Water incursion into a well bore via a permeable sand formation (zone) is a common problem in petroleum production. FIG. 1 illustrates this problem as encountered in the production zone of a Kern River, California well. A substantial water entry is experienced in the 695 to 715 foot level. The total depth of the well is 754 feet. Persuant to the method of the present invention the water incursion can be corrected. The rods, pump and tubing employed in producing the well are pulled. The well is then plugged with sand to about the 680 foot level and a 2 7/8 inch tubing delivery string fitted with a rubber cap packer (see FIG. 1) is run into the well to the 670 foot level. The string also has a pump seating nipple at the 427 foot level (static annulus liquid level). After the introduction of the delivery string of pipe and the packer, the annulus liquid level is checked, and if necessary, the annulus is refilled with liquid to the 420 foot level.

Before introducing the acid-settable liquid and dissolved catalyst system into the well bore via the delivery string, it is desirable to establish that a fluid can be pumped into the formation. The test is made by pumping water into the delivery string. When the ability to pump water into the zone is established, the pumping is discontinued.

For the treatment of the formation about 10 barrels of a furfuryl alcohol resin prepolymer-furfuryl alcohol mixture (an 80:20 volume ratio mix) is desirably used as the acid-setting liquid. Where the bottom hole temperature is moderate, for example about 60°C., and the formation porosity permits relatively easy introduction of the liquid into the formation, a convenient setting time for the liquid is about 2 hours. To achieve this timing about three weight percent (based upon the liquid) of a pyridine-α-trichlorotoluene delayed catalyst mixture is dissolved in the acid-setting fluid. The mole ratio of pyridine to the trichloride should be about 1 to 1. The 10 barrels of liquid are pumped through the delivery tube into the formation. A follow-up of about 1.25 barrels of water is pumped to displace the residual liquid from the delivery line and to introduce it into the formation. This is followed with a circulating plug that is pumped to the pump seating nipple with water. This circulating plug prevents overdisplacement of the treating liquid by the fluid head in the delivery tube. After about 2 hours at the formation temperature, the liquid commences to set and polymerization is completed after an additional period of about 2 hours. If desirable, the polymerized liquid may be given added time to cure by shutting-in the well. Before removing the delivery line, the formation seal should be tested. This is accomplished by retrieving the circulating plug with a wire line (not shown in the FIGURE) and attempting to pump water into the zone. In this test the surface pressure should not exceed a reasonable value, for example, it should be less than about 200 pounds per square inch. After the delivery line is removed, the well is returned to production.

The Acid-Settable Liquid

The delayed catalyst system of the present method is, in general, useful as a timely source of strong acid for liquids which set or gel at a pH below 5 under the influence of a relatively strong (pKa less than 5) acid, and these acid-settable liquids are contemplated for use. Those liquids which respond to an acid catalyst at a pH below 3 are especialy contemplated for use in the present method. While known acid-settable liquids are in the main organic materials, acid-settable inorganic liquids can likewise be effectively catalysed by my method.

Organic liquids which set under the catalytic influence of a strong acid (pKa less than 5) are preferred for the treatment of a terrestrial zone or formation. These liquids usually contain one or more organic compounds (monomers), partially polymerized monomers (oligomers or prepolymers) or mixtures of monomers and oligomers which polymerize (gel and set up) when the pH of the liquid is reduced below 5, preferably below 3. The release of strong acid from the acid-releasing compound(s) involves the solvolytic action of a hydroxylic material as discussed below. Therefore, the liquid of itself must be:

1. an acid-settable hydroxylic liquid;
2. a nonhydroxylic acid-settable liquid which contains at least an effective amount of a hydroxylic acid-settable liquid; or
3. a nonhydroxylic acid-settable liquid which contains an effective amount of:
   a. water;
   b. one or more substantially neutral (i.e., exhibiting a pH in water or aqueous ethanol at 18°C. of about 7) and soluble organic compounds of the formula $R(OH)_n$ ($n$ is 1, 2 or 3), in which R is an organic radical;
   c. a mixture of water and the above neutral hydroxylic compounds; and
   d. or the like.

An effective amount is one which provides at least 1 equivalent of hydroxyl group per equivalent of available strong acid from the acid-releasing compound.

Some acid-settable liquids are very reactive and may be designated as flash-setting (auto-accelerating) liquids. These are most preferred for use in the method of the invention. Representative liquids of this type are furfuryl alcohol, furfuryl alcohol-furfuryl alcohol oligomer mixtures, furfuryl alcohol prepolymers, and acid-setting liquids which contain a substantial percent (at least 20 weight percent) of furfuryl alcohol. These materials set readily after a suitable reduction in pH, assist in the generation of strong acid by solvolytic action and release a large amount of heat energy in polymerizing. The released heat energy in turn facilitates the desired setting of the liquid. My delayed catalyst system is particularly effective in controlling flash-setting, acid-settable liquids.

Representative acid-settable organic liquids satisfactory for use herein include furfuryl alcohol, methyl vinyl ketone, vinyl ethers, acrolein, butadiene, styrene, N-vinyl pyrrolidone, and mixtures of the foregoing; acid-settable mixtures such as urea-formaldehyde, phenol-formaldehyde, cresol-formaldehyde, melamine-formaldehyde, furfuryl alcohol-formaldehyde, furfuryl alcohol-furfuraldehyde, and the like mixtures, as known in the art; isoprene, and other acid-polymerizable polyolefinic hydrocarbons; and especially acid-polymerizable organic liquids which contain at least about 20 weight percent of furfuryl alcohol.

Representative acid-settable inorganic liquids satisfactory for use include aqueous and alcoholic silicates.

DELAYED CATALYST SYSTEM

The delayed catalyst systems suitable for use in the catalysis of an acid-setting fluid contain one or more acid-releasing compounds, and it has now been found that the timing of the catalytic action of these compounds can be effectively controlled or delayed by the action of a base. Both the acid-releasing compound(s) and the base(s) should be dissolved, i.e., homogeneously distributed throughout the acid-setting liquid. For each equivalent of potential acid, an amount of the base in the range 0.02 to 0.98, preferably 0.05 to 0.95, equivalents, is usually effective for a deliberate delay of the setting time of an acid-settable liquid.

Several variables can be employed to modify the action of a delayed catalyst for an acid-settable liquid. These include:

1. the particular acid-releasing compound(s) chosen;
2. the base or bases employed;
3. the relative amounts of (1) and (2) employed; and
4. the polarity (dipole moment) of the liquid acid-settable mixture.

Items (1) and (2) are described more fully in the pertinent sections below.

Figure 2:
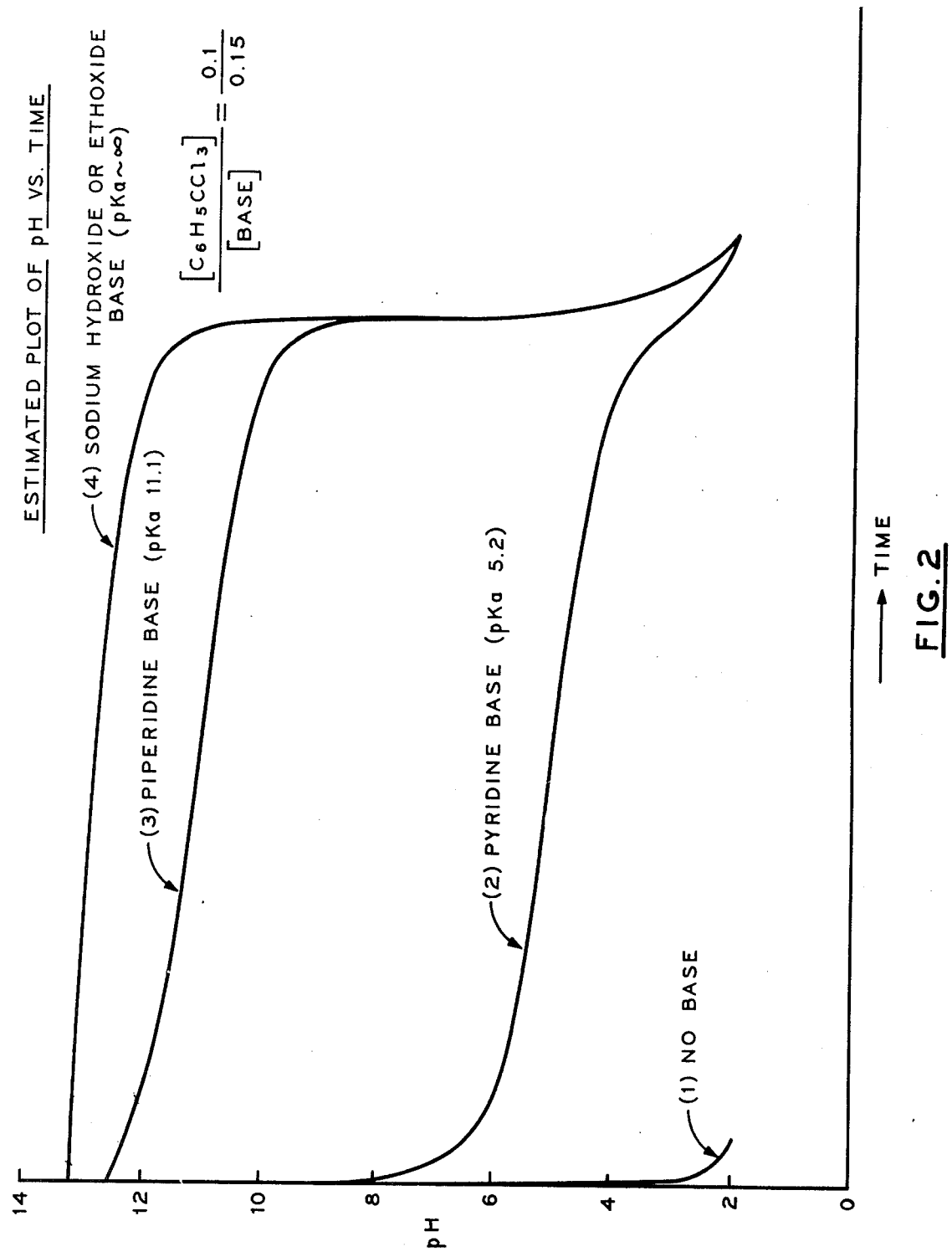

Chemical aspects of the method of the invention are conveniently illustrated by reference to the curves of FIG. 2. These curves represent the estimated change in pH as a function of elapsed time of a representative mixture containing furfuryl alcohol and α-trichlorotoluene at a temperature of about 25°C., first, in the absence of a base, and then, in the presence of the indicated bases. The mole ratio of the trichloride to the base was 1 to 1.5 and the potential acid to base equivalence ratio was 2 to 1.

In the absence of a suitable base, Curve (1), the pH of the mixture decreases rapidly and reaches a value control of the length of the time which will be available for the placement of the liquid in an earthen formation.

The generation of a strong acid from the acid-releasing compound involves the production of charged particles, ions.

TABLE I

TRICHLOROTOLUENE(TCT)-PYRIDINE CATALYZED FURFURYL ALCOHOL POLYMERIZATIONS

| MOL RATIO, TCT PYRIDINE | EQUIVALENCE RATIO; ACID BASE | TCT PERCENT | Gel Time, Hr:Min | | | |
|---|---|---|---|---|---|---|
| | | | 25°C. | 60°C. | 80°C. | 100°C. |
| 1/0 | ∞ | 2 | 6:17 | :17 | — | :02 |
| | | 4 | 1:49 | :11 | — | — |
| | | 6 | 1:35 | — | — | — |
| 1/0.25 | 12 | 2 | 6:02 | — | — | — |
| | | 4 | 5:35 | — | — | — |
| | | 6 | 6:44 | — | — | — |
| 1/0.5 | 6 | 2 | 8:–16: | :33 | — | — |
| | | 4 | 8:–16: | :28 | — | — |
| | | 6 | 8:–16: | :28 | — | — |
| 1/1 | 3 | 2 | 22:50 | 1:18 | :15 | :07 |
| | | 4 | 20:22 | 1:14 | :14 | :07 |
| | | 6 | 21:09 | 1:15 | :14 | :06 |
| 1/1.5 | 2 | 2 | — | 1:23 | :23 | — |
| | | 4 | — | 1:31 | :20 | — |
| | | 6 | — | 1:26 | :20 | — |
| 1/2 | 1.5 | 2 | — | * | :34 | :10 |
| | | 4 | — | 2:58 | :36 | :09 |
| | | 6 | — | 3:05 | :33 | :07 |
| 1/2.5 | 1.2 | 2 | — | 7:–21: | :45 | — |
| | | 4 | — | 7:–21: | :40 | — |
| | | 6 | — | 7:–21: | :53 | — |
| 1/3 | 1 | 2 | — | * | 1:15 | :20 |
| | | 4 | — | * | 1:16 | :19 |
| | | 6 | — | * | 1:23 | :15 |
| 1/4 | 0.75 | 2 | — | — | — | * |
| | | 4 | — | — | — | * |
| | | 6 | — | — | — | * |

*No solid product after 24 hours at temperature.

(about 2.5) sutiable for catalyzing the setting-up of an acid-settable liquid in a relatively short time, i.e., about 15 minutes. A fifteen minute interval is, in general, insufficient as a practical matter for the satisfactory placement of a mixture in a subterranean zone adjacent to a well bore at an ordinary depth, for example, a depth of about 2,000 to 5,000 ft.

When a base is added to the mixture, Curves (2), (3), and (4), the rate of the pH change with the time is markedly reduced and, consequently, the time available for use of such a mixture, for example by placement of the mixture in a subterranean zone, is increased to a practical range.

These curves illustrate that the pH leveling effect of the added base varies depending upon the strength of the base. Thus, where the liquid responds to a pH on the weakly acid side, for exaple in the range 3–5, a relatively strong base should be employed. Similarly, where the effective pH is below about 3, a wider range of bases, relatively weak as well as strong, can be employed for the control of a delayed catalyst system.

The length of the delay can be varied depending upon the acid-base equivalence ratio of the delayed catalyst system employed. In Table I below are listed data which illustrate the effect of changes in the acid-base equivalence ratio. In general, when the acid-base equivalence ratio is increased, the length of the time delay is shortened. As this ratio approaches 1, the delay becomes longer for a given temperature and where the ratio is essentially 1, substantially complete inhibition of the catalyst usually is experienced. Thus, depending upon the working time required for a convenient placement of the liquid in the subterranean zone, the method of the invention provides a useful "chemical clock" for Therefore, as a general consideration, the more polar the medium, the faster is the rate. Since water is a highly polar compound, the addition of water in minor amounts (0.1 to 5 weight percent) to hydroxy-substituted acid-settable organic liquids usually increases the acid-generation rate. Accordingly, the addition of a minor amount of water to such an acid-settable liquid affords a further means for controlling the setup time.

The Acid-Releasing Compound

An organic compound which releases a strong acid under solvolysis conditions is, in general, satisfactory for use and is contemplated for us in the method of my invention provided that:

1. the compound of itself (prior to solvolysis) exhibits a substantially neutral pH, i.e., about 7 in aqueous ethanol at 18°C.;
2. the solvolysis rate (acid-releasing rate) of the compound is within the required range for suitable pH control; and
3. the compound is sufficiently soluble in the acid-settable liquid to provide the strong acid needed to reduce the pH to the required level.

The acid-releasing component of the mixture may be one or more compounds. Usually it is more convenient to employ a single acid-releasing compound.

By a strong acid, as used herein, is meant by definition an acid of the Bronsted-type which has a pKa (water at 18°C.) below 3. Strong acids having a pKa of less than 2 are preferred herein.

Acid-releasing compounds suitable for use in my invention generate a strong acid at a rate in the range $10^{-3}$ to $10^{-6}$ equivalent, preferably $10^{-4}$ to $10^{-5}$ equivalent per liter per minute at a temperature within the process range. Acid-releasing compounds which are free of acid halide substituent groups, i.e., free of sulfonyl and acyl groups, are a preferred class of compounds.

The generation in situ of an acid catalyst, as herein described, involves a reaction system which includes one or more hydroxyl-containing compounds and one or more compounds which are the source (precursors) of the acid anion. Thus, the reaction is a solvolytic generation of strong acid which may be illustrated in a simplified manner by the equation:

$$C_6H_5CCl_3 + HOH \xrightarrow{k_1} \{C_6H_5CCl_2OH\} + HCl$$

In the above example the indicated solvolysis and subsequent interactions have been found to result in the timely production of three mols of hydrochloric acid per mol of the acid-releasing compound. Hence, α-trichlorotoluene has a molar potential of three equivalents of strong acid. As indicated in the equation above, the dissociation of the acid-releasing compound, here α-trichlorotoluene, is rate controlling, is a first order reaction, and for all practical purposes the rate depends upon the nature of and the concentration of the acid-releasing compound. It has been found that the addition of an appropriate amount of the acid-releasing compound and of a suitable base to an acid-settable liquid provides a means which can be used to effectively control the timing of the polymerization (acid-setting) of the acid-settable fluid.

Some acid-generating compounds also yield strong acid by reaction with a hydroxylic solvent or reagent in a reaction whose rate is a second-order reaction. These compounds are also satisfactory for use in combination with a suitable base as in a "chemical clock" system similar to the above-described method.

Prime considerations in the selection of strong acid-releasing (AR) compound for use in a delayed catalyst system include the temperature of the fluid at the point of use and the magnitude of the reaction rate constant for acid production for the acid-releasing compound at this operating temperature. Ordinarily, the operational temperature is the temperature prevailing in the zone or situs of use when the acid-settable fluid is to be set up. For example, depending upon the location and depth of a subterranean zone, the operational temperature may be as low as −10°C., or as high as 175°C., but usually is in the range from 0°C. to 150°C.

The magnitude of the solvolysis reaction constant for the AR compound at the temperature of use should be large enough to insure a useful rate of acid production, yet not so large as to impracticably reduce the working time for the placement of the fluid in the zone. In general, at the operational temperature the reaction constant, $k_1$, for a satisfactory first-order AR compound is believed to be in the range $2 \times 10^{-2}$ to $2 \times 10^{-7}$ sec$^{-1}$, and preferably is in the range from $1 \times 10^{-4}$ to $1 \times 10^{-5}$ sec$^{-1}$.

The solvolytic displacement reactions which yield an acid are known in the art. The reaction constants are also known for a great many of these compounds, as are also the routine methods employed for determining these constants. A leading reference and exposition of this art is the review textbook, "Solvolytic Displacement Reactions" by A. Streitwieser, McGraw Hill Book Co. (1962). This text lists 811 references in the literature relating to this field of the chemical art. Another useful source containing rate constants is the National Bureau of Standards Circular 510, "Tables of Chemical Kinetics — Homogeneous Reactions", U.S. Department of Commerce (1951).

Representative strong acid-generating reactions and reactants include those summarized by the equations:

$$C_6H_5CCl_3 + 2 H_2O \rightarrow C_6H_5CO_2H + 3 HCl \qquad (1)$$

$$\underset{\underline{\qquad\qquad\qquad}}{OCOCH=CHCO} + H_2O \rightarrow HOOCCH=CHCOOH \qquad (2)$$

$$C_6H_5SO_2Cl + CH_3OH \rightarrow C_6H_5SO_3CH_3 + HCL \qquad (3)$$

$$(Cl_2HCCO)_2O + H_2O \rightarrow 2 Cl_2HCCO_2H \qquad (4)$$

$$p\text{-}CH_3C_6H_4SO_3CH_2CH_3 + H_2O \rightarrow p\text{-}CH_3C_6H_4SO_3H \\ + CH_3CH_2OH \qquad (5)$$

$$CH_3COCl + CH_3OH \rightarrow CH_3CO_2CH_3 + HCl \qquad (6)$$

$$C_6H_5CHBr_2 + H_2O \rightarrow C_6H_5CHO + 2HBr \qquad (7)$$

$$C_{10}H_7CH_2Cl + CH_3CH_2OH \rightarrow C_{10}H_7CH_2OCH_2CH_3 \\ + HCl \qquad (8)$$

$$(CH_3)_3CBr + H_2O \rightarrow (CH_3)_3COH + HBr \qquad (9)$$

$$(CH_3)_2SO_4 + H_2O \rightarrow CH_3OSO_3H + CH_3OH \qquad (10)$$

Representative classes of organic acid-releasing compounds suitable for use as components in the delayed acid-setting catalyst system of the invention include the organic chlorides, bromides and iodides, and the like, which satisfy the aforementioned pH, solubility, and solvolysis rate requirements; also, the acid anhydrides of strong acids, the esters of organic sulfonic acids, and the like, which likewise satisfy those requirements. The aforementioned halocompounds include representative subclasses such as the alkyl halides, the aralkyl halides, the cycloalkylalkyl halides, aryl sulfonyl halides, the acyl halides, the cycloalkyl halides, and the alkylcycloalkyl halides where the halogen atoms are chlorine, bromine or iodine.

As a practical matter and for reasons of cost, convenience and the like, the suitable organic acid-releasing compounds will, in general, have a carbon atom content of less than 21 carbon atoms, preferably less than 12.

Representative acid-releasing compounds useful as components of the delayed catalyst system of my invention include α-trichlorotoluene, t-butyl bromide, t-butyl iodide, benzene sulfonyl chloride and bromide, maleic anhydride, trichloroacetic acid anhydride, 1-pentanesulfonyl bromide, ethyl benzenesulfonate, diethyl sulfate, sec-butyl bromide, 3-iodohexane, β-cyclohexylethyl chloride, n-butyryl chloride, cyclohexyl bromide, 2-ethylcyclohexyl iodide, α-tribromotoluene, α,α-dichlorotoluene, α,α-dibromotoluene, o-tolyldichloromethane, 1-(α-trichloromethyl)-naphthalene, 4-(dibromomethyl)-biphenyl, p-(perchloromethyl)-toluene, o-(perchloromethyl)-toluene, 1,4-(perchloromethyl)-benzene, 1,4-(dichloromethyl)-benzene, α-chlorotoluene, α-bromotoluene, α-iodotoluene, α,α'-p-xylylene dibromide, α,α'-p-xylylene dichloride, benzhydril chloride and bromide, dichloroacetic anhydride, α-chloropropionic acid anhydride, p-t-butylbenzyl chloride and bromide, $(CH_3)_3CCH_2Br$, $(CH_3)_3CCH_2CH_2Br$, $CH_3(CH_2)_2CH_2Br$, $(CH_3)_3CCH=CHCCH_2Br$, $CH_3OCH_2Cl$, $CH_3OCH_2Br$, $CH_3COOCH_2Cl$, $C_6H_5COCH_2Br$, $C_6H_5COOCH_2Cl$, $C_6H_5CCl_2CCl_3$, isopropyl benzenesulfonate, t-amyl chloride, α-phenylethyl chloride, p-methoxy-α-chlorotoluene, and the like acid-releasing organic compounds which release a strong acid under solvolytic reaction conditions at a useful rate at a temperature in the range from −10°C. to 175°C., preferably from 0°C. to 150°C.

Arylmethyl chlorides, bromides and iodides are especially preferred acid-releasing compounds for use in the instant invention, particularly the polyhalo analogues. The latter yield more than one equivalent of strong acid per mol. They may be represented by the formula $AR[CH_{3-y}X_y]_n$, where $y$ is 1, 2 or 3 and $n$ is 1 or 2, and AR is a benzene or a naphthalene ring and X is a halide such as chloride bromide, or iodide, or those compounds of the formula which are substituted by replacing 1 or 2 hydrogen atoms bonded to the aryl ring carbon atoms by 1 or 2 inert substituent groups, Y, such as a chloride, bromide, alkoxide, $NaOSO_2-$, $KOSO_2-$, $NH_4OSO_2-$ or alkyl group. Preferred carbon atom contents for these particular acid-releasing compounds are the same as disclosed above.

In those instances where the acid-settable liquid may be quite polar (have a high dipole moment), neutral organic acid-releasing compounds tend to have a low solubility and may not be satisfactorily distributed throughout the fluid. In this event, the sodium salt of a corresponding sulfonated derivative is desirably employed. For example, ammonium 2,4-di(trichloromethyl)benzene sulfonate is a useful source of a strong acid and is a salt which will have a reasonable solubility in a polar medium.

The Base Component

Except as noted below, organic and inorganic bases capable of neutralizing a strong acid under solvolytic conditions are, in general, suitable for use in the method of my invention. Thus, salt-forming bases, in general, are contemplated for use. As in the case of the other components of the catalyst system, the base should be homogeneously distributed in the acid-settable fluid. Better results can therefore be achieved when the components are present as solutes in the fluid.

Since the generated acid is a strong acid, the range of bases suitable for neutralizing the acid is extensive. For example, bases in general which have a pKb (determined in water or aqueous ethanol at 18°C.), which is less than 13.5 are satisfactory. These include inorganic and organic bases. Prime factors relating to the selection of the base for my delayed catalyst system include:
1. the solubility of the base in the acid-settable fluid; and
2. the pH which should be maintained prior to the drop to the level required for catalysis.

The base should be soluble to an extent necessary for the sufficient delay of the pH drop. And where the acid-settable liquid sets under the influence of a weakly acidic pH (3–5), a strong base (pKb<6) is desirably employed.

Organic and inorganic bases noted above are suitable for use as components in the delayed catalyst system of my method except in the case where the AR compound is an acid halide (acyl and sulfonyl). In this exceptional case, pyridine and the like nucleophilic aromatic heterocyclic nitrogen bases and aryl amines are not satisfactory.

Representative classes of bases suitable for employment, except as noted above, include alkali metal hydroxides, alkali metal salts of weak acids (pKa in water at 18°C. above 5), alkali metal alkoxides, organic nitrogen bases, i.e., primary, secondary, and tertiary amines, and the like.

Representative bases suitable herein, except as noted above, include sodium hydroxide, potassium hydroxide, sodium butoxide, sodium acetate, pyridine, piperidine, triethylamine, diethylamine, sodium ethoxide, cyclohexylamine, N,N-dimethylaniline, di-n-butylamine, aniline, quinoline, isobutylamine, di-(2-ethylhexyl)amine, 4,4'-diaminobenzophenone, 4,4'-diamino diphenyl ether, diisopropyl amine, hexamethylene diamine, ethylene diamine, ethanolamine, diethanolamine, triethanolamine, ispropylamine, octylamine, sodium benzoate, and the like compounds. Organic nitrogen bases, in general, are preferred for use as the base component of a delayed latent catalyst system. Of these, the pyridine-type nitrogen bases in admixture with an aryl halomethyl-type AR compound (see discussion above for formulation) yield catalyst mixtures having excellent shelf lives and are, therefore, especially useful herein. Pyridine-type bases include pyridine, quinoline and isoquinoline and these compounds in which 1, 2 or 3 of the hydrogen atoms attached to the carbon atoms of the heterocyclic ring are replaced by 1, 2 and 3 inert substituent groups such as chloride, bromide, alkyl ($C_1-C_{10}$), and phenyl. These are conveniently described by the formula $(ARN)(X)_n$, where ARN represents pyridine, quinoline or isoquinoline less $n$ hydrogen atoms, X is an inert substitutent group, and $n$ is 1, 2 or 3.

Other representative pyridine-type bases suitable for use in the invention include the crude and refined coal tar fractions from coking which contain so-called pyridine crude bases, picolines and the like.

As a practical matter and for reasons of cost, convenience and the like, the organic bases used in the method should have a carbon atom content of less than 21, preferably less than 12.

Relative Amounts of Catalyst and Fluid

The amount of the catalyst system (AR compound plus base) desirably included in the acid-settable fluid varies depending in the main upon the acid potential (equivalent weight) of the AR compound and the pH needed for an effective setting of the fluid. At a pH of 5 the solvated hydrogen ion concentration is $10^{-5}$ mol per liter, and at a pH of 2, it is $10^{-2}$ mol per liter. Hence, the solvolysis of only a correspondingly small amount of the AR compound is necessary to provide these amounts of strong acid. Aside from a cost factor, the presence of a substantial excess of the AR compound, as a rule, is advantageous. By reference to FIG. 3, it is evident that there is no marked variation in the set time for the acid-settable fluid over a wide concentration range for the present delayed catalysts. This circumstance is a particular and practical advantage of the method herein because the man in the field need only use ordinary means for measuring and introducing the catalyst into the fluid.

Figure 3:
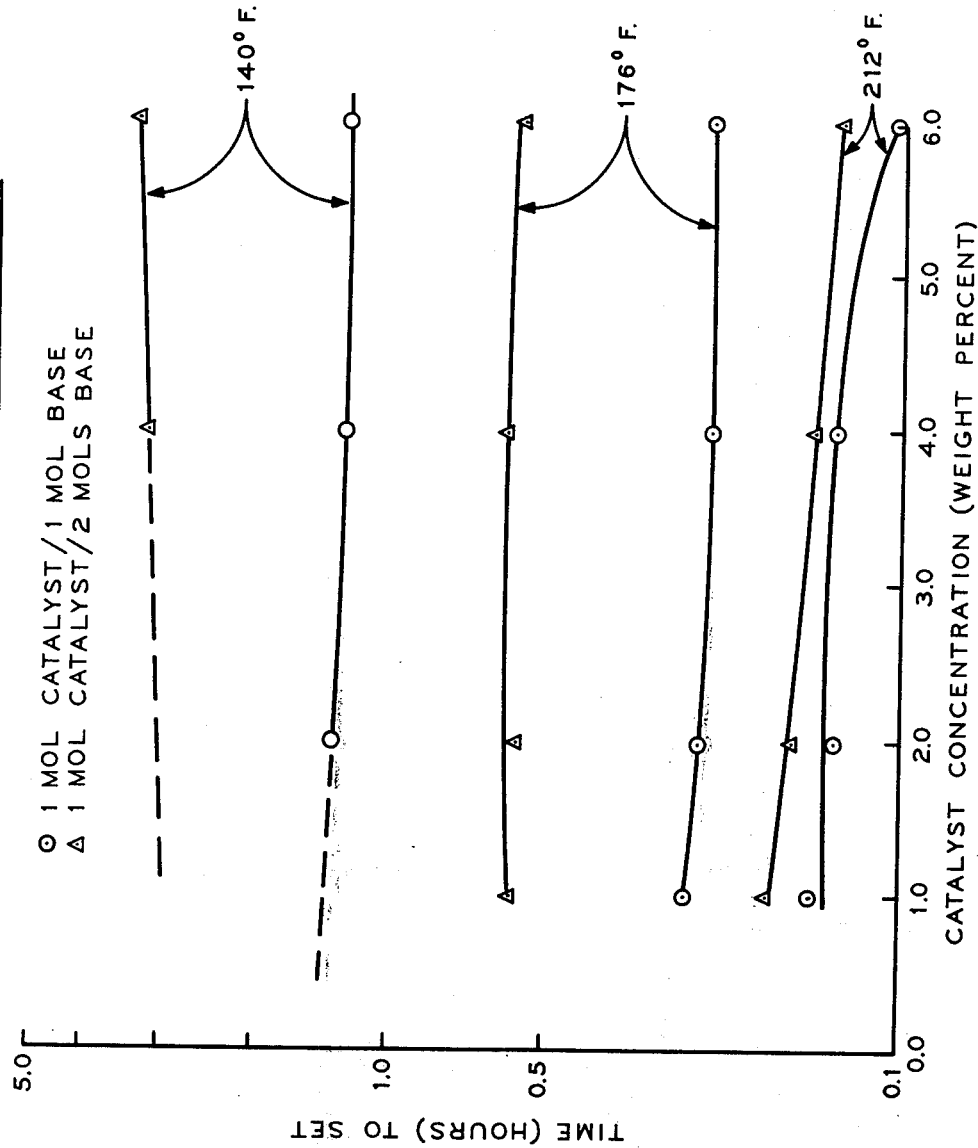

FIG. 3 demonstrates that the prime concern re the catalyst requirement is that the addition of at least the minimum satisfactory amount be made. In general, a satisfactory amount of the delayed catalyst is in the range 2 to 20 parts per 100 parts of the acid-settable fluid, preferably 3 to 6 parts.

Placement of Fluid in Zone

The placement of the present acid-settable fluids in a subterranean zone, for example in a zone surrounding a well bore, is readily accomplished by ordinary methods. However, the one-step integral nature of the present fluids and method usually makes possible the employment of simplified and more convenient procedures. Spacer fluids, for example, are not required for the separation of reactive chemicals. The time available for the placement can be delayed to provide a convenient and safe rate of introduction.

In one method, a suitably sized pipe string is lowered into the well bore with the bottom of the tubing being positioned for delivery of fluid into the bore adjacent to the treatment zone. The fluid is then forced out of the bore and into the formation by displacement with other liquids or a suitable inert gas.

Ordinarily the zone and well bore environs will be substantially free of strong acid or base. Consequently, no pretreatment will be needed. Should there be a residue of strong acid in the zone or well bore, as from an acid treatment, then a neutralizing preflush should precede the placement of the consolidation liquid mixture. For example, a prewash using dilute aqueous ammonia is a convenient means for neutralization of the acid. A follow-up water or hydrocarbon preflush may be desirable. If the zone to be treated (consolidated or plugged) is a carbonate formation, the introduction of an acid-setting liquid containing a relatively larger amount of the acid-releasing compound is usually desirable. Alternatively, it may be more economical to pacify the carbonate formation by ordinary methods, for example, as known in the art, by the introduction into the formation of an aqueous calcium chloride preflush.

The acid-setting liquid is usually pumped into the well bore or formation. Accordingly, it should have a viscosity in the range suitable for convenient pumping, i.e., a pumpable liquid. Preferably, the liquid should have a viscosity in the range 1 to 300 centipoise. Although the use of a fluid having a viscosity in the upper portion of the range is less convenient to pump, nevertheless, the use of a fluid having a relatively high viscosity is often preferable because plug flow is better, undesirable channeling of the fluid in the zone may be minimized, and the fluid is more likely to stay in place after pumping ceases.

Ordinarily, commercially available acid-settable liquids have a suitable viscosity or the viscosity can be readily reduced, for example by the addition of furfuryl alcohol, or of some other suitable diluent, monomer or oligomer, or of a minor amount of water, methanol, benzene or the like.

After the acid-settable liquid is introduced into the terrestrial zone or formation, it must remain in place until the setting occurs. Thus, depending upon the particular liquid employed, it must be maintained in place for a period of from 1 to 24 hours, preferably 2 to 6 hours.

The following examples further illustrate, but not by way of limitation, the invention.

EXAMPLES 1 TO 16

The use of a variety of representative bases for preparing a delayed acid catalyst system are illustrated in these examples. The acid-settable liquid employed was a mixture of 80 parts of a commercial resin and 20 parts of furfuryl alcohol. The resin was a liquid composed of partially polymerized furfuryl alcohol, i.e., furfuryl alcohol oligomers, which were capable of further polymerization with a strong acid catalyst to form a solid, furfuryl alcohol polymer.

Based upon 100 parts of the acid-settable liquid, 5 parts of acid-releasing (AR) compound were used and the amount of the base included was sufficient for the neutralization of one-fourth of the total acid available from the AR compound. The AR compounds, bases used, and results for the temperatures indicated were as follows:

| EX. NO. | Benzenesulfonyl Chloride, 25°C. BASE | GEL TIME, MINS. |
|---|---|---|
| 1 | None | 60 |
| 2 | Triethylamine | 67 |
| 3 | Triethanolamine | 95 |
| 4 | Tri-n-butylamine | 76 |
| 5 | Cyclohexylamine | 125 |

| EX. NO. | α-Chlorotoluene, 93°C. BASE | GEL TIME, MINS. |
|---|---|---|
| 6 | None | 41 |
| 7 | Triethylamine | 72 |
| 8 | Triethanolamine | 218 |
| 9 | Tri-n-butylamine | 87 |
| 10 | Cyclohexylamine | 215 |

| EX. NO. | α-Chlorotoluene, 115°C. CATALYST WT. % | BASE | GEL TIME MINS. |
|---|---|---|---|
| 11 | 4 | Triethanolamine | 74 |
| 12 | 6 | " | 76 |
| 13 | 8 | " | 63 |
| 14 | 10 | " | 55 |

In these examples the catalyzed solutions remained predominantly unchanged until the reaction time approached. Then the solutions turned from clear to blue-green to black. Reaction occurred rapidly with total conversion of the liquid to solid.

The foregoing examples demonstrate the delay of free-acid generation from suitable low temperature AR compound, benzenesulfonyl chloride, and from a relatively high temperature AR compound, benzyl chloride, by a number of representative nitrogen bases. These systems are especially suitable for use in plugging voids or relatively open zones in an earthen formation.

EXAMPLES 15 TO 22

In the manner described above in Examples 1–14, gel times were determined for furfuryl alcohol using the indicated AR compound with and without pyridine base. Based upon the furfuryl alcohol, the weight percent of the AR compound used together with the temperatures used and with the result obtained are listed in Table II.

TABLE II

| EX. NO. | CHLOROTOLUENES AS LATENT CATALYSTS AND DELAYED LATENT CATALYSTS FOR FURFURYL ALCOHOL | | | | | |
|---|---|---|---|---|---|---|
| | CATALYST, MOL RATIO α-TCT/PY | CATALYST, WEIGHT PERCENT | Gel Time, Hr:Min. | | | |
| | | | 25°C. | 60°C. | 80°C. | 100°C. |
| 15 | 1/0 | 2 | 6:17 | :17 | — | :02 |
| | | 4 | 1:47 | :11 | — | — |

TABLE II-continued

CHLOROTOLUENES AS LATENT CATALYSTS AND DELAYED LATENT CATALYSTS FOR FURFURYL ALCOHOL

| EX. NO. | CATALYST, MOL RATIO α-TCT/PY | CATALYST, WEIGHT PERCENT | Gel Time, Hr:Min. 25°C. | 60°C. | 80°C. | 100°C. |
|---|---|---|---|---|---|---|
| 16 | 1/1 | 6 | 1:35 | — | — | — |
|  |  | 2 | 22:50 | 1:18 | :15 | :07 |
|  |  | 4 | 20:22 | 1:14 | :14 | :07 |
|  |  | 6 | 21:09 | 1:15 | :14 | :06 |
| 17 | 1/2 | 2 | — | * | :34 | :10 |
|  |  | 4 | — | 2:58 | :36 | :09 |
|  |  | 6 | — | 3:05 | :33 | :07 |
| 18 | 1/3 | 2 | — | * | :75 | :20 |
|  |  | 4 | — | * | :76 | :19 |
|  |  | 6 | —. | * | :83 | :15 |
| α-DICHLORO-TOLUENE/PY | | | | | | |
| 19 | 1/0 | 2 | * | 4:–24: | :09 | — |
|  |  | 4 | * | 4:–24: | :06 | — |
|  |  | 6 | : | :13 | :04 | — |
| 20 | 1/1 | 2 | — | * | * | :20 |
|  |  | 4 | — | * | 1:32 | :30 |
|  |  | 6 | — | 24: | 1:20 | :29 |
| 21 | 1/2 | 2 | — | — | * | 4: |
|  |  | 4 | — | — | 21:–28: | 1:45 |
|  |  | 6 | — | — | 21:–28: | 4: |
| α-CHLORO-TOLUENE/PY | | | | | | |
| 22 | 1/0 | 2 | * | * | — | 3½:** |
|  |  | 4 | * | * | — | 3½: |
|  |  | 6 | * | * | — | 3½: |

*No solid product formed in 24 hours at temperature.
**Solid product, but no obvious gel point.

WATER ADDITION

EXAMPLES 23 to 28

In these examples α-trichlorotoluene (TCT) and pyridine were mixed in a molar ratio of 1 to 1. Portions of this mixture were then added to furfuryl alcohol (FA) or to a furfuryl alcohol-water mixture, as noted in the Table below, and the gel times at 60°C. for the mixtures were determined.

TABLE III

| EX. NO. | Wt. FA / Wt. H₂O | TCT ADDED, Wt. % | GEL TIME, MIN. |
|---|---|---|---|
| 23 | 100/0 | 2 | 41 |
| 24 | 100/0 | 4 | 53 |
| 25 | 100/0 | 6 | 56 |
| 26 | 90/10 | 2 | 17 |
| 27 | 90/10 | 4 | 16 |
| 28 | 90/10 | 6 | 15 |

Examples 23–28 demonstrate that the addition of water to an acid-settable organic liquid is a useful means for reducing the delay of a delayed catalyst system. Water also improves the leveling effect of the delayed catalyst system, i.e., there was little or no change of gel times over a range of catalyst concentrations.

SAND IMPREGNATION

EXAMPLES 29 to 34

The conditions in a loose porous earthen formation were simulated for laboratory tests by filling test tubes with sand and filling the interstices of the sand with the acid-settable fluid. In each example, 5 weight percent of the indicated AR compound was used and the acid-settable liquids were mixtures of furfuryl alcohol and formaldehyde (formalin) having the mol ratios as noted in Table IV.

TABLE IV

| EX. NO. | MOL RATIO FURFURYL ALCOHOL TO FORMALDEHYDE | MOL RATIO CATALYST TO PYRIDINE | REACTION TEMPERATURE, °C. 25 | 40 | 60 | 80 | 100 |
|---|---|---|---|---|---|---|---|
| | | | α-TRICHLOROTOLUENE | | | | |
| 29 | 1/1 | 1/0 | 8<t<19 hr | 1 hr 34 min | 4 min | 1 min | — |
|  |  | 1/1 | — | 2 hr 32 min | 14 min | 2 min | — |
|  |  | 1/2 | 6.5<t<22.5 hr | 1 hr 18 min | 4 min | — |
|  |  | 1/3 | — | — | 4 hr 25 min | 2 hr | 5 min |
| 30 | 2/1 | 1/0 | 8<t<19 hr | 1 hr 41 min | 4 min | 1 min | — |
|  |  | 1/1 | — | 2 hr 30 min | 16 min | 3 min | — |
|  |  | 1/2 | 6.5<t<22.5 hr | 1 hr 52 min | 5 min | — |
|  |  | 1/3 | — | — | 3 hr 13 min | 1 hr 30 min | 6 min |
| 31 | 3/1 | 1/0 | 8<t<19 hr | 1 hr 43 min | 5 min | 2 min | — |
|  |  | 1/1 | — | 2 hr 48 min | 38 min | 4 min | — |
|  |  | 1/2 | 6.5<t<22.5 hr | 1 hr 51 min | 6 min | — |
|  |  | 1/3 | — | — | 6 hr 56 min | 1 hr 21 min | 8 min |
| 32 | 4/1 | 1/0 | 8<t<19 hr | 2 hr 25 min | 6 min | 2 min | — |
|  |  | 1/1 | — | 2 hr 50 min | 51 min | 6 min | — |
|  |  | 1/2 | 6.5<t<22.5 hr | 1 hr 50 min | 6 min | — |
|  |  | 1/3 | — | — | 6 hr 24 min | 2 hr 9 min | 8 min |

TABLE IV-continued

| EX. NO. | MOL RATIO FURFURYL ALCOHOL TO FORMALDEHYDE | MOL RATIO CATALYST TO PYRIDINE | REACTION TEMPERATURE, °C. | | | | |
|---|---|---|---|---|---|---|---|
| | | | 25 | 40 | 60 | 80 | 100 |
| | | | | | α-CHLOROTOLUENE | | |
| 33 | 2/1 | 1/0 | — | — | — | — | 28 min |
| | | 2/1 | — | — | — | — | 1 hr 11 min |
| | | 1/1 | — | — | — | — | 1 hr 58 min |
| 34 | 3/1 | 1/0 | — | — | — | — | 30 min |
| | | 2/1 | — | — | — | — | 1 hr 28 min |
| | | 1/1 | — | — | — | — | 3 hr 20 min |

— Reaction not performed.

The resulting polymer impregnated sands were hard, stable solids. For reactions above 80°C., α-trichlorotoluene was unsatisfactory. The rate of acid-generation at this temperature, i.e., the solvolysis rate, for the trichloride was inconveniently fast. The rate for α-chlorotoluene is satisfactory at high temperatures and hence it was used for the examples at 100°C. These examples demonstrate that delayed catalysts are useful for the setting of an acid-settable fluid in an earthen formation.

CORE PLUGGING

EXAMPLES 35 TO 40

The conditions in a stable permeable earthen formation were simulated in a laboratory test using cores of Boise sandstone. Each core was 3 inches long and 1 inch in diameter and was cut parallel to the bedding plane. Prior to use, they were extracted with toluene, dried in a vacuum oven at 125°C. and under a vacuum of 29 in. of mercury. The dried cores were vacuum saturated with deionized water and then encased in either an aluminum or monel tube using a suitable adhesive. The initial permeabilities for the cores were measured at 10 psi using deionized water.

Core plugging tests were conducted at 25°, 40°, 60°, 80°, 100° and 120°C. The plugging behavior of a given solution at each temperature was investigated by using a suite of four cores. Initially, the cores were mounted in potted core holders, placed in an oven, and allowed to reach the desired temperature. The cores and core holders were then removed from the oven and 15 ml of plugging solution were injected into each core. The cores were then shut in and replaced in the oven. After one, two, and three hours, and overnight, a core was removed from the core holder, the ends of the core were cleaned and/or faced off as necessary, and replaced in the core holders. Finally, the plugged permeabilities were measured using deionized water at room temperature and 100 psi. All permeability measurements and plugging injections were made by flowing in the same direction.

Table V is a summary of these examples in which five percent of the AR compound and the indicated acid-settable fluid was used. The AR compound was α-trichlorotoluene or α-chlorotoluene as noted.

TABLE V

| EX. NO. | REACTION TEMPERATURE | MOL RATIO: FURFURYL ALCOHOL Formaldehyde | MOL RATIO CATALYST Pyridine | SHUT-IN TIME | $K_I$** md | $K_F$*** md | % Shut-Off |
|---|---|---|---|---|---|---|---|
| 35 | 25°C. | 2/1 | No Pyridine | 69 hr | 1126.8 | 6.85 | 99.4 |
| | | | | 69 hr | 1278.8 | 12.1 | 99.1 |
| 36 | 40°C. | 3/1 | No Pyridine | 1 | 1103.7 | 107.7 | 90.2 |
| | | | | 2 | 852.6 | 0.1 | 100.0 |
| | | | | 3 | 878.9 | 22.1 | 97.4 |
| | | | | 19 | 1034.0 | 3.4 | 99.7 |
| 37 | 60°C. | 2/1 | 1/2 | 1 | 735.2 | 116.1 | 84.2 |
| | | | | 2 | 759.3 | 29.7 | 96.1 |
| | | | | 3 | 1285.8 | 84.9 | 98.9 |
| | | | | 19 | 853.8 | 4.4 | 99.5 |
| 38 | 80°C. | 1/1 | 1/3 | 1 | 1165.9 | 688.1 | 41.0 |
| | | | | 2 | 1156.6 | 11.0 | 99.1 |
| | | | | 3 | 738.1 | 30.5 | 95.9 |
| | | | | 19 | 1425.0 | 0.1 | 100.0 |
| 39 | 100°C. | 2/1 | *1/1 | 1 | 774.7 | 676.9 | 12.6 |
| | | | | 2 | 1039.4 | 116.9 | 88.8 |
| | | | | 3 | 1226.3 | 436.7 | 63.8 |
| | | | | 19 | 1082.7 | 23.7 | 97.8 |
| 40 | 120°C. | 3/1 | *1/1 | 1 | 1170.6 | 437.8 | 62.6 |
| | | | | 2 | 1171.7 | 212.9 | 81.8 |
| | | | | 3 | 1113.2 | 39.7 | 96.4 |

*α-chlorotoluene catalyst
**Initial permeability
***Final permeability

Examples 35–40 demonstrate that stable porous earth formations can be effectively sealed or plugged by the use of an acid-generating catalyst. They also demonstrate that, in general, a 95 percent and higher reduction in permeability can be achieved in a period of 2–3 hours.

In order to simulate conditions in the field where aqueous brine or hydrocarbons are present in the formation, cores that were initially saturated with these materials were also tested. These were run under similar conditions at 60°C. The permeability was measured after three hours and overnight shut-in periods. The permeability reduction of brine-saturated cores averaged 92%, or slightly less than most cores that were initially saturated with deionized water, but this is still satisfactory performance. The diesel oil saturated cores both exhibited 100% shut-off. The process is thus relatively unaffected by extraneous fluid saturations.

AGING TEST OF PLUGGED CORES

EXAMPLES 41 TO 47

In order to check the durability of plugs formed by the one-step furfuryl alcohol process, selected plugged cores were put into 2½% brine solution at 93°C. for static brine aging. Cores that had been plugged at 40°, 60°, 80° and 100°C., and that were shut-in for three hours or longer, were used in this test. Because the cores were potted, their exposure to the aging environment was limited, but they were nonetheless subjected to 93°C. heat for the aging period. The aged cores were faced off before each permeability measurement in order to eliminate effects of corrosion products in the aging fluid that could act to plug them. α-Trichlorotoluene (TCT) or α-chlorotoluene (CT) were the AR compounds used and pyridine (PY) was the inhibitor. Table VI summarizes the aging data.

TABLE VII

ACID-SETTABLE RESIN POLYMERIZATIONS

| EX. NO. | RESIN TYPE | TCT PYR | TCT PERCENT | GEL TIME 60°C., MIN. |
|---|---|---|---|---|
| 48 | Furfuryl Alcohol | 1/0 | 4 | 11 |
|  |  | 1/1 | 4.8 | 65 |
|  |  | 1/1 | 6.2 | 70 |
|  |  | 1/1 | 7.7 | 70 |
| 49 | Furfuryl Alcohol Resin | 1/0 | 4 | 18 |
|  |  | 1/1 | 4.8 | 114 |
|  |  | 1/1 | 6.2 | 110 |
|  |  | 1/1 | 7.7 | 120 |
| 50 | Urea-Formaldehyde Resin | 1/0 | 4 | 7 |
|  |  | 1/1 | 4.8 | 13 |
|  |  | 1/1 | 6.2 | 12 |
|  |  | 1/1 | 7.7 | 15 |
| 51 | Phenolic Resin | 1/0 | 4 | 9 |
|  |  | 1/1 | 4.8 | 13 |
|  |  | 1/1 | 6.2 | 11 |
|  |  | 1/1 | 7.7 | 11 |

TABLE VI

CORE AGING RESULTS

| EX. NO. | PROCESS IDENTIFICATION MOL RATIOS F.A./H₂C=O | PROCESS IDENTIFICATION MOL RATIOS TCT/PYR | RUN TEMP. °C. | SHUT IN TIME HR. | $K_I$ | $K_F$ | % SHUT OFF | AGING TIME, DAYS | % SHUT OFF | AGING TIME, DAYS | % SHUT OFF | AGING TIME, DAYS | % SHUT OFF |
|---|---|---|---|---|---|---|---|---|---|---|---|---|---|
| 41 | 2/1 | — | 25 | 69 | 1126.8 | 6.9 | 99.4 | 21 | 99.9 | 51 | 99.9 | — | — |
|  | 2/1 | — | 25 | 69 | 1278.8 | 12.1 | 99.1 | 21 | 99.8 | 51 | 99.7 | — | — |
| 42 | 1/1 | — | 40 | 3 | 1258.3 | 34.8 | 97.2 | 21 | 97.0 | 51 | 96.9 | — | — |
|  | 1/1 | — | 40 | 69 | 1137.3 | 25.6 | 97.8 | 21 | 97.0 | 51 | 97.3 | — | — |
| 43 | 2/1 | 1/2 | 60 | 3 | 1183.1 | 44.0 | 96.3 | 26 | 95.6 | 56 | 96.9 | — | — |
|  | 2/1 | 1/2 | 60 | 44 | 1305.2 | 19.4 | 98.5 | 24 | 98.1 | 54 | 99.2 | — | — |
| 44 | 3/1 | 1/3 | 80 | 19 | 1218.9 | 24.3 | 98.0 | 20 | 98.1 | 42 | 97.1 | 79 | 97.1 |
|  | 1/1 | 1/3 | 80 | 19 | 592.4 | 72.0 | 87.8 | 20 | 96.4 | 42 | **74.2 | 79 | 76.6 |
| 45 | 2/1 | 1/0* | 100 | 3 | 952.2 | 37.6 | 96.1 | 18 | 96.9 | 48 | 96.4 | 83 | 96.1 |
|  |  | 1/1* | 100 | 19 | 1082.7 | 23.7 | 97.8 | 18 | 97.8 | 48 | 96.9 | 83 | 96.9 |
|  |  |  |  | CORES INITIALLY SATURATED WITH DIESEL OIL |  |  |  |  |  |  |  |  |  |
| 46 | 2/1 | 1/2 | 60 | 3 | 740.2 | 0.0 | 100.0 | 17 | 100.0 | 39 | 100.0 | 76 | 100.0 |
|  | 2/1 | 1/2 | 60 | 19 | 619.3 | 0.6 | 99.9 | 17 | 100.0 | 39 | 100.0 | 76 | 100.0 |
|  |  |  |  | CORES INITIALLY SATURATED WITH 10% BRINE |  |  |  |  |  |  |  |  |  |
| 47 | 2/1 | 1/2 | 60 | 3 | 497.2 | 34.6 | 93.1 | 17 | 94.6 | 39 | 93.0 | 76 | 91.9 |
|  | 2/1 | 1/2 | 60 | 19 | 488.2 | 44.5 | 91.2 | 17 | 93.0 | 39 | 91.3 | 76 | 91.5 |

*Solution catalyzed with α-chlorotoluene
**Core fractured during aging

The foregoing Examples 41–47 demonstrated that the static aging of the plugged cores showed an average of 1% permeability return after about 8 weeks in the aging tanks. There was no apparent difference in the durability of plugs with long or short shut-in times, or those plugs formed in oil or brine saturated cores. These examples demonstrate that the use of delayed acid-generating catalysts with acid-settable liquids is an effective method for plugging stable porous earthern formations.

ACID-SETTABLE LIQUIDS

EXAMPLES 48 TO 51

Under comparable conditions, furfuryl alcohol, furfuryl alcohol resin, urea-formaldehyde resin, and phenolic resin were polymerized at 60°C. The delayed catalyst was α-trichlorotoluene (TCT) and pyridine (PY) at a 1 to 1 mol ratio. The results are listed in Table VII. The furfuryl alcohol was of commercial grade. The resins were typical acid-settable, commercially available, partially polymerized resins.

Examples 48–51 and the other examples above demonstrate that acid-settable liquids, that is liquids which set under the influence of a strong acid, are effectively polymerized under the influence of a delayed acid catalyst. These examples and the other examples above further demonstrate that the method of the present invention is a useful means for delaying or controlling the time of setting of an acid-settable liquid which is set by means of a latent acid-releasing compound.

DILUTION WITH ORGANIC DILUENTS

Examples 52–57 illustrate the effect of dilution upon the gelling or setting up time of an acid-settable liquid catalysed by a representative latent catalyst system. In these examples, the AR compound was α-trichlorotoluene (TCT). The determinations were made at 25°C., using the diluents and concentrations and results as noted in Table VIII below:

TABLE VIII

| EX. NO. | DILUENT, PERCENT | GEL TIME, HR:MIN METHANOL | GEL TIME, HR:MIN ACETONE | GEL TIME, HR:MIN BENZENE |
|---|---|---|---|---|
| 52 | 0 | 1:11 | — | 1:12 |
| 53 | 10 | 2:11 | 3:22 | 2:23 |
| 54 | 20 | 4:48 | 5:23 | 4:15 |
| 55 | 30 | 6:16 | 7:13 | 6:34 |

TABLE VIII-continued

| EX. NO. | DILUENT, PERCENT | GEL TIME, HR:MIN | | |
|---|---|---|---|---|
| | | METHANOL | ACETONE | BENZENE |
| 56 | 40 | 8:05 | 8:47 | 8:30 |
| 57 | 50 | — | 10:10 | — |

The above examples demonstrate a further degree of freedom in the controlling of the gelating or setting time of an acid-settable liquid as herein. Similar results obtain when a delayed catalyst, i.e., when a base is added as herein described, is employed. Thus, the setting-up time of the liquid can be further delayed for a delayed catalyst system by dilution with inert organic liquids (note methanol, as described above, furnishes a proton for strong acid generation where no other hydroxylic agent is present). Usually for an impermeable consolidation of a formation, the degree of dilution should not exceed about 50 volume percent, preferably should not exceed 30 volume percent; otherwise, the dilution may be by as much as 70 volume percent.

EXAMPLE 58

The shelf life of two typical α-trichlorotoluene-pyridine (TCT/PY) delayed latent catalyst mixtures were determined for mixtures prepared and placed in storage under ambient temperature conditions, i.e., about a 22°C. average temperature. After 1 year the aged composition and freshly prepared control catalyst mixtures were tested as delayed latent catalysts (5 parts-weight) for the setting of a typical furfuryl alcohol-furfuryl alcohol prepolymer mixture (95 parts-weight) with the results as follows:

| MIXTURE | TCT/PY MOL RATIO | TIME TO SET, MIN. |
|---|---|---|
| Control Mix | 1:1 | 16 |
| Aged Mix | 1:1 | 16 |
| Control Mix | 1:2 | 33 |
| Aged Mix | 1:2 | 35 |

These comparative data demonstrate that delayed latent catalyst mixtures in which an α-trichloromethyl substituted aromatic compound is the acid-releasing component and a pyridine-type organic nitrogen component is the delaying agent have excellent shelf lives. These mixtures may be compounded, stored and conveniently used simply by the addition of a portion of the mix to the acid-setting liquid, mixing the combined portions well, and introducing the resulting mixture into a terrestrial zone or formation or as desired. The relative amounts of those novel catalyst systems which are added to the acid-setting liquid may vary over a range (see examples in preceding sections) and can be conveniently carried out in the field.

In addition to being useful in effecting the setting (polymerizing) of an acid-settable liquid in the usual difficult circumstances encountered in a terrestrial zone, and particularly where the use is in a well bore environment, the delayed latent catalyst system herein provides useful improvements, in general, in the setting of an acid-settable liquid by a strong acid. Representative improvements include the use as a catalyst in the impregnation of solids such as wood, fiber glass cloth, felt, burlap, and the like porous materials with an acid-settable liquid containing a delayed latent catalyst of the invention. It also includes the use of a delayed catalyst for setting of acid-settable liquids as adhesive for glass sheeting, and as a martar when a mixture of the liquid, catalyst and sand is applied to common bricks, cinder blocks, and the like earthen materials. Principle elements of the improvements reside in the controlled delay of the setting of the liquid and in the convenient unitary aspect of the working mixture, catalyst and acid-settable liquid. The following examples illustrate further useful aspects of the invention.

EXAMPLE 59

A solid homopolymer of furfuryl alcohol was prepared using a delayed catalyst obtained by mixing 3 mols of pyridine with 4 mols of α-chlorotoluene. A mixture of 97 parts of the alcohol and 3 parts of the catalyst was maintained at 180°F. for about 9 hours. The controlled catalysis permitted a slow homogeneous polymerization of the acid-settable alcohol without localized hot spots, voids and the like problems. The cured product was an ebony black solid having the following characteristics:

| | |
|---|---|
| Compressive Strength (ASTM No. D-695-63T), psi | 15,700 |
| Tensile Strength (ASTM No. D-638-61T), psi | 28,000 |
| Izod Impact (ASTM No. D-256-56), ft.lbs/inch | 0.17 |
| Shear Impact (ASTM No. D-732-46), psi | 5,050 |
| Specific Gravity, g/ml | 1.27 |

This example demonstrates that the delayed latent catalyst of my invention is useful for the effective control of acid-settable liquids whose polymerizations are ordinarily very vigorous and highly exothermic. It further illustrates that the present method is useful for the production of engineering plastics from furfuryl alcohol. Similar useful results are obtained when acid-settable liquids comprising copolymers such as phenolformaldehyde, urea-formaldehyde, melamine-formaldehyde and the like mixed monomeric acid-settable liquids are set using a homogeneous mixture of the liquid and a delayed latent catalyst as herein. Variations, such as the addition of a filler-like asbestos, glass cloth, glass fibers, etc. to the monomer or comonomer mixtures, are also effectively handled.

EXAMPLE 60

A section of fiber glass cloth was spread out on a wooden surface and impregnated with a commercially available acid-settable liquid. The latter contained about 80 volume percent of a furfuryl alcohol oligomeric mixture and 20 volume percent of furfuryl alcohol. The delayed catalyst was an equimolar mixture of α-trichlorotoluene and pyridine. Five parts by weight of the catalyst were mixed with 95 parts of the liquid and the mixture was applied to the supported cloth. After about 17 hours at 110°C., the polymerization and cure of the supported glass cloth was completed. The adherence of the polymerized liquid to the glass and wood was excellent.

EXAMPLE 61

A mortar was made using the acid-settable liquid described in the preceding example. The delayed catalyst was a 4 to 1 molar mixture of benzenesulfonyl chloride and cyclohexyl amine. Five parts (weight) of the catalyst was mixed with 95 parts of the liquid. The mortar was prepared by mixing the following:

| | |
|---|---|
| Nevada No. 130 sand, g. | 115 |
| Acid-settable liquid and catalyst, g. | 50 |

The mixture was then placed between common red bricks. After 24 hours at the ambient temperature, the bricks were effectively bonded together.

This example and Examples 29–34 demonstrate that the delayed latent catalyst, as herein, is useful for the preparation of sand molds in which an acid-settable liquid is the bonding agent. The control (delay) in the setting time provided by the instant catalyst system simplifies and improves the preparation of sand molds.

EXAMPLE 62

A block of ordinary sugar pine wood was impregnated with a mixture of furfuryl alcohol (95 parts-weight) and a delayed latent catalyst (5 parts) by immersion of the wood in the mixture for 15 minutes. The catalyst was an equimolar mixture of α-trichlorotoluene and pyridine. After 24 hours at 110°C., the acid-settable liquid in the impregnated wood had polymerized and cured.

The above Examples 59–62 demonstrate that a mixture of a suitable organic acid-releasing compound, as described above, and a suitable base, also as described above, is an effective delayed latent catalyst for the setting, in general, of acid-settable liquids which are set by the action of a strong acid.

The delayed latent catalyst system herein is also useful for effecting a permeable consolidation in an unconsolidated terrestrial formation and the like with an acid-settable liquid. This is illustrated in the following examples.

EXAMPLE 63

Nevada 135 sand was charged to a 60-inch Hassler cell. The sand and cell was maintained at 150°F. and a mixture of an acid-settable liquid (95 parts-weight) and a delayed latent catalyst (α-trichlorotoluene-pyridine; equimolar mixture; 5 parts) was injected into the sand. The liquid was a commerciaL furfuryl alcohol resin. After the injection of the liquid, the excess liquid was removed from the sand and permeability was established by injecting an inert fluid, kerosene, into the sand. The cell was then shut in. The residual acid-settable liquid adhering to the sand set under the generated catalytic influence of the delayed catalyst. The consolidated sand averaged 450 md permeability and 6600 psi compressive strength. In conventional practice and prior to the present discovery an additional stage is required because the catalyst must be separately introduced into the unconsolidated material after the permeability flush. In addition to the disadvantageous requirement of an additional operational stage, the conventional method suffers from the usual problems inherent in a multistage method for the introduction and contacting of reactants in a well bore and its surrounding formations.

EXAMPLE 64

Unconsolidated sand, as in the previous example, was charged to a Hassler cell. A mixture of a commercially available acid-settable phenolic resin in 2-propanol (50 weight percent solution) and containing 5 parts of an equimolar mixture of α-trichlorotoluene and pyridine per 95 parts of the resin was injected into the sand. The cell and its contents were maintained at 150°F. for about 18 hours. The resulting consolidated sand averaged 120 md permeability and a compressive strength of 1220 psi.

EXAMPLE 65

In the manner of Example 64, sand was consolidated except that a furfuryl alcohol resin (80% furfuryl alcohol oligomer and 20% furfuryl alcohol monomer) was substituted for the phenolic resin. The consolidation averaged a 160 md permeability and a compressive strength of 700 psi.

Examples 63–65 demonstrate that the delayed latent catalyst system herein is an effective catalyst for the consolidation of unconsolidated earthen formations, especially by the overflush and by the phase separation methods in which an acid-settable liquid is the bonding agent. They also establish that the acid-settable liquid and catalyst combination, as herein, are useful in the installation of precoated sand packs, and prepacked liners in wells, especially oil wells.

Other advantages for the method herein include its use in connection with the plugging of a section of a well bore, the plugging of a vug, and the plugging of a thief zone.

In view of the above examples, acid-settable liquids, and especially furfuryl alcohol-type liquid and liquid oligomeric mixtures, are useful for the treatment of or bonding of wood, paper, glass, ceramics, coal, coke, nut shells, sand, soil, and the like. Accordingly, the method herein is useful for controlling the setting of acid-settable liquids in their use as soil stabilizers, grouting agents, and bonding agents for wood and coal fines, and for sandtype foundry castings, molds and the like.

Another of the many advantageous aspects of the delayed catalyst systems herein is the absence of any appreciable change in viscosity of the liquid during the extended working time obtained from the presence of the base component. This circumstance is especially useful because it eliminates variation in the viscosity parameter, which can be, and often is, a severe process burden.

It will be readily appreciated from the above disclosure and examples that variations can be made therein and equivalents may be substituted without going beyond the purview of the invention or exceeding the scope of the claims.

I claim:

1. The method of setting an acid-settable liquid which sets at a temperature in the range from about −10°C. to 175°C. at a pH of less than about 5, which comprises dissolving in said liquid in parts by weight an amount of a delayed latent catalyst in the range from about 2 to 20 parts per 100 parts of the liquid, said catalyst being a mixture of a component which releases a strong acid and a basic component wherein the mixture contains an amount of base in the range from 0.02 to 0.98 equivalent per equivalent of releasable strong acid from the acid-releasing component; said liquid being an organic liquid selected from the group consisting of:

a. acid-settable hydroxylic liquids;
    b. nonhydroxylic acid-settable liquids which contain at least an effective amount of a hydroxylic acid-settable liquid; and
    c. nonhydroxylic acid-settable liquids which contain at least an effective amount of a soluble diluent selected from the group consisting of:
1. water;
2. one or more substantially neutral organic compounds of the formula $R(OH)_n$, in which $n$ is 1, 2 or 3 and R is an organic radical; and
3. a mixture of the compounds of 2) and water;

said basic component being one or more suitable bases selected from the group consisting of organic and inorganic salt-forming bases having a pKb of less than about 13.5; and said acid-releasing component being one or more substantially neutral compounds selected from the group consisting of organic compounds which release a strong acid under solvolytic conditions at a rate in the range of from about $10^{-3}$ to $10^{-6}$ equivalent of the acid per liter per minute at said temperature.

2. The method as in claim 1 wherein the acid-releasing compounds are free of acid halide substituent groups.

3. The method as in claim 1 wherein:
a. the strong acid is a mineral acid:
b. the temperature is in the range from 0° to 150°C.;
c. the acid-settable liquid sets at a pH which is below 3;
d. the acid-settable liquid is an organic liquid which contains at least 20 weight percent of furfuryl alcohol;
e. the liquid contains an amount of the catalyst mixture which is in the range 3 to 6 parts per 100 parts of the liquid;
f. the amount of the base in the mixture is in the range from 0.05 to 0.95 equivalent per equivalent of releasing strong acid;
g. the acid-releasing compounds are free of acid halide substituent groups, and have a carbon atom content of less than 21;
h. the base component is one or more organic compounds which contain basic nitrogen and which have a carbon atom content of less than 21; and
i. the rate of release of the strong acid is in the range from about $10^{-4}$ to $10^{-5}$ equivalent per liter per minute.

4. The method as in claim 3 wherein the acid-releasing compounds are selected from the group consisting of:
a. compounds of the formula $AR(CH_{3-y}X_y)_n$, in which AR is a benzene or naphthalene ring, $y$ is 1, 2 or 3, X is a halide selected from the group consisting of chloride, bromide and iodide, and $n$ is 1 or 2; and
b. compounds as in (a) in which 1 or 2 of the hydrogen atoms of the ring are replaced by 1 or 2 inert substituents selected from the group consisting of chloride, bromide, alkoxide, $NaOSO_2—$, $KOSO_2—$, $NH_4OSO_2$, and alkyl.

5. The method as in claim 1 wherein the acid-releasing compound(s) are acid halides and the basic component is free of pyridine-type and aromatic amines.

6. The method of setting furfuryl alcohol which comprises dissolving in said furfuryl alcohol in parts by weight an amount of a delayed latent catalyst in the range from about 2 to 20 parts per 100 parts of the alcohol, said catalyst being a mixture of a component which releases a strong acid and a basic component wherein the mixture contains an amount of base in the range from 0.02 to 0.98 equivalent per equivalent of releasable strong acid from the acid-releasing component; said basic component being one or more suitable bases selected from the group consisting of organic and inorganic salt-forming bases having a pKb of less than about 13.5; and said acid-releasing component being one or more substantially neutral compounds selected from the group consisting of organic compounds which release a strong acid under solvolytic conditions at a rate in the range of from about $10^{-3}$ to $10^{-6}$ equivalent of the acid per liter per minute at said temperature.

* * * * *